United States Patent [19]
Nakamura et al.

[11] Patent Number: 5,715,794
[45] Date of Patent: Feb. 10, 1998

[54] ENGINE CONTROL SYSTEM AND METHOD

[75] Inventors: Michihisa Nakamura; Kousei Maebashi; Noritaka Matsuo, all of Iwata, Japan

[73] Assignee: Yamaha Hatsudoki Kabushiki Kaisha, Iwata, Japan

[21] Appl. No.: 645,121

[22] Filed: May 13, 1996

[30] Foreign Application Priority Data

| May 12, 1995 | [JP] | Japan | ................................. 7-114282 |
| May 17, 1995 | [JP] | Japan | ................................. 7-118389 |

[51] Int. Cl.$^6$ ................................. F02P 5/14
[52] U.S. Cl. ................................. 123/425
[58] Field of Search ................................. 123/425, 419, 123/435; 73/115, 116, 112.3; 364/431.07

[56] References Cited

U.S. PATENT DOCUMENTS

| 3,444,730 | 5/1969 | Bysarovich | 123/425 |
|---|---|---|---|
| 3,978,718 | 9/1976 | Schorsch | 73/117.3 |
| 4,567,755 | 2/1986 | Ootsuka et al. | 73/117.3 |
| 4,633,707 | 1/1987 | Haddox | 73/47 |
| 4,691,288 | 9/1987 | Kay et al. | 364/511 |
| 4,739,649 | 4/1988 | Tanaka | 73/115 |
| 4,744,243 | 5/1988 | Tanaka | 73/115 |
| 4,781,059 | 11/1988 | Suzuki et al. | 73/117.3 |
| 4,843,870 | 7/1989 | Citron et al. | 73/116 |
| 4,892,075 | 1/1990 | Iriyama et al. | 123/425 |
| 4,898,025 | 2/1990 | Weyland | 73/117.3 |
| 5,127,262 | 7/1992 | Demizu et al. | 73/117.3 |
| 5,191,788 | 3/1993 | Nishimura | 73/35 |
| 5,196,844 | 3/1993 | Tomisawa et al. | 340/870.29 |
| 5,197,325 | 3/1993 | Tamura et al. | 73/117.3 |
| 5,245,866 | 9/1993 | Hashiguchi et al. | 73/117.3 |
| 5,287,737 | 2/1994 | Osawa et al. | 73/117.3 |
| 5,309,756 | 5/1994 | Osawa et al. | 73/116 |
| 5,359,518 | 10/1994 | Wimmer | 364/431.03 |
| 5,379,634 | 1/1995 | Kuroda et al. | 73/116 |
| 5,529,040 | 6/1996 | Takeda et al. | 123/425 |
| 5,535,722 | 7/1996 | Graessley et al. | 123/425 |
| 5,557,476 | 9/1996 | Iyoda | 123/425 |
| 5,598,822 | 2/1997 | Fujishita et al. | 123/425 |

FOREIGN PATENT DOCUMENTS

| 0153004 | 8/1985 | European Pat. Off. | 123/425 |
| 0199431 | 10/1986 | European Pat. Off. | 123/425 |

OTHER PUBLICATIONS

Japanese SAE Paper Publication No. 924068, dated Oct. 19, 1992.
IEEE Transactions on Vehicular Technology, vol. 38 No. 3, Aug. 1989, New York US pp. 180–192, XP000101478N G. Rizzoni 'A Stochastic Model for the Indicated Pressure Process and the Dynamics of the Internal Combustion Engine' (the whole document).
Patent Abstracts of Japan, vol. 6, No. 133 (p–129) (1011) 20 Jul. 1982 & JP-A-51 07 235 (Toyota Jidosha Kogyo K.K.) 6 Apr. 1982.
European Search Report dated Nov. 18, 1994.

*Primary Examiner*—Raymond A. Nelli
*Attorney, Agent, or Firm*—Knobbe, Martens, Olsen & Bear LLP

[57] ABSTRACT

An engine measurement and control methodology wherein the engine combustion rate and IMEP are measured by measuring the in-cylinder pressure at specific crank angles and utilizing a basic reading of pressure in the combustion chamber when it will be near to atmospheric, and also at at least one point in time after ignition begins and before top dead center. The measured data can be employed for fine tuning the engine control to obtain optimum performance.

40 Claims, 6 Drawing Sheets

ENGINE CONTROL SYSTEM AND METHOD

BACKGROUND OF THE INVENTION

This invention relates to an engine control system and method and more particularly to an improved method and system for improving and measuring the performance of internal combustion engines.

In an interest to improve the performance of internal combustion engines while at the same time reducing their fuel consumption and controlling exhaust emissions, various systems have been provided that utilize lean burn techniques and/or exhaust gas recirculation (EGR). However, it is well known that either attempting to operate on lean burn and/or utilizing large mounts of EGR tend to cause significant fluctuations in the engine output and, accordingly, undesirable performance. Normal engine sensors are not capable of determining these fluctuating conditions which are primarily the result of unstable combustion and which adversely effect driveability.

Therefore arrangements have been provided to attempt to measure the actual engine performance in the form of in-cylinder pressure and/or engine output torque. These features are employed to determine indicated mean effective pressure (IMEP).

One method by which this is done is to measure the in-cylinder pressure at one or more positions during the cyclic changes of the combustion chamber volume. The measured pressures are then employed so as to attempt to calculate or determine engine torque and/or mean effective pressure, and use deviations from the desired for control purposes.

In accordance with one method, the measurement occurs at five specific crankshaft angles, such as 155° before top dead center, 5° after top dead center, 20° after top dead center, 35° after top dead center, and 50° after top dead center. The reading taken 155° before top dead center were utilized as a basis for calculating a base pressure, and this is then utilized to adjust the .values at the other readings in order to attempt to indicate engine torque.

However, even if the pressure change inside the combustion chamber at two angles remains constant, the actual burning conditions in the combustion chamber make such measurements unreliable. For example, the changing of the timing of ignition, amount of fuel supplied and fuel-air ratio will change the combustion pressure characteristics in a spark-ignited engine. In a diesel engine, the timing of fuel injection, amount of fuel injection, fuel injection pressure and air-fuel ratio can also vary the pressure curve.

It is, therefore, a principal object of this invention to provide an improved method and apparatus for measuring the pressure characteristics in a variable volume chamber of an engine to provide more accurate and reliable output data.

It is a further object of this invention to provide a method and apparatus for more accurately determining the in-cylinder conditions for engine control purposes.

Although the measurement of engine torque and/or IMEP are very effective, systems that are designed to produce maximum torque or maximum IMEP under these conditions may not always provide the best performance. That is, if the system is designed so as to maintain maximum torque or maximum IMEP under certain conditions, then the actual in-cylinder pressure variation caused as a result of the timing of ignition may not produce the best running condition.

It is, therefore, a still further object of this invention to provide an improved engine control system wherein the combustion conditions may be monitored and altered so as to produce the desired pressure curve in the combustion chamber.

SUMMARY OF THE INVENTION

This invention is adapted to be embodied in an internal combustion engine and control system, wherein the engine has means that define a combustion chamber which varies in volume cyclically during engine operating condition. The volume varies from a maximum volume which may be considered the BDC condition, and a minimum volume condition which may be considered as the TDC condition. An induction system is provided for delivering an intake charge to the combustion chamber. Means are provided for initiating combustion in the combustion chamber, and an exhaust system is provided for discharging the exhaust gases from the combustion chamber. In addition, a pressure sensor is provided for sensing the pressure in the combustion chamber at least certain output shaft angles.

In accordance with a method for practicing the invention, the pressure is measured at a time between the end of the exhaust stroke and the beginning of the compression stroke, at a crank angle after that angle and after ignition, and before top dead center, and at crank angles between the compression stroke and the expansion stroke at top dead center and in areas after top dead center. These measurements are utilized so as to determine and control engine performance.

An engine operated in accordance with the :invention is effective to take measurements of the combustion chamber pressure at the positions noted in the preceding paragraph and to control the engine in response to those measurements.

DETAILED DESCRIPTION OF THE PREFERRED EMBODIMENTS OF THE INVENTION

Figure 1:
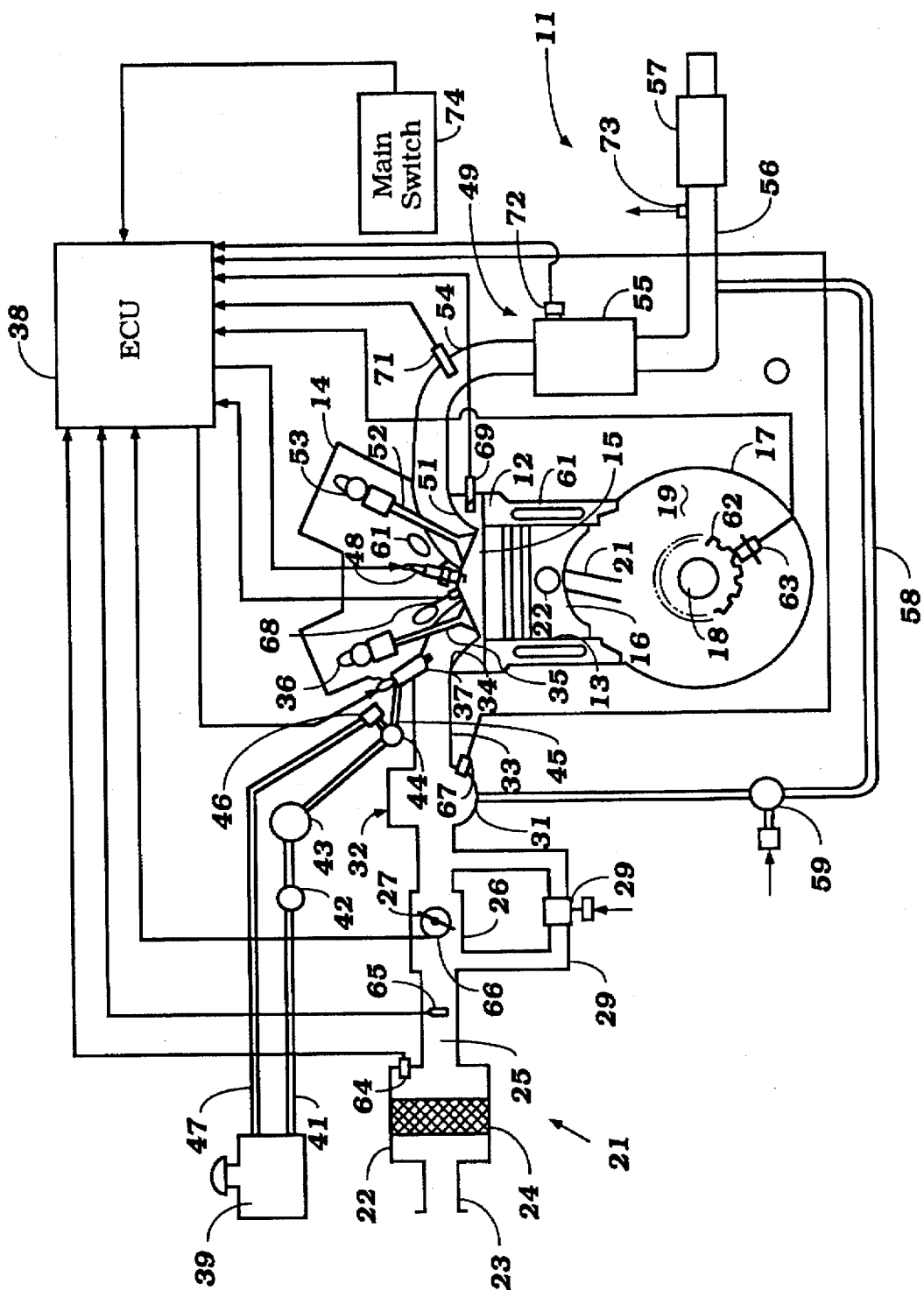
FIG. 1 is a partially schematic cross-sectional view taken through a single cylinder of a multi-cylinder, four-cycle internal combustion engine constructed and operated in accordance with a first embodiment of the invention.

Referring now initially to the embodiment of FIGS. 1–4, and first to FIG. 1, a four-cycle internal combustion engine constructed in accordance with this embodiment is shown partially and in somewhat schematic fashion. In the illustrated embodiment, the engine 11 is shown as a multi-cylinder in-line type, although a cross-section of only a single cylinder appears in the drawing. Although the invention is described in conjunction with such an engine, it will be readily apparent to those skilled in the art how the invention may be practiced with multiple cylinder and/or single cylinder four-cycle engines having any Configuration. Also and as will become apparent by reference to FIGS. 5 and 6, the invention may also be practiced with two-cycle engines having a wide variety of configurations.

The engine 11 may be used as a power plant for many types of applications, as will be apparent to those skilled in the art. In a preferred embodiment the engine 11 may be used to power a motor vehicle such as an automobile.

The engine 11 is comprised of a cylinder block 12 having one or more cylinder bores 13. The upper ends of the cylinder bores 13 are closed by a cylinder head assembly 14 that is affixed to the cylinder block 12 in a known manner. The cylinder head assembly 14 has individual recesses 15 that cooperate with each of the cylinder bores 13. These recesses 15, the cylinder bores 13 and pistons 14 which reciprocate in the cylinder bores 13 form the variable volume combustion chambers of the engine. At time, the combustion chamber will be designated by the reference numeral 15, because the clearance area provided by this recess constitutes a substantial portion of a volume of the engine 11 when at its top dead center (TDC) position.

The end of the cylinder bore 13 opposite from the cylinder head recess 15 is closed by a crankcase member 17 which is also affixed to the cylinder block 12 in a known manner. A crankshaft 18 is rotatably journaled in a crankcase chamber 19 formed by the crankcase member 17 and a skirt of de cylinder block 12. This journaling of the crankshaft 18 may be of any known type. In fact, since the primary portion of the invention deals with the engine measurement and control strategy, a generally conventional engine has been illustrated. Therefore, if any details of the engine 11 are not described, they may be considered to be conventional.

A connecting rod 21 is connected by means of a piston pin 22 to the piston 16. The opposite end of the connecting rod 21 is journaled on a throw of the crankshaft 18 in a well known manner.

An induction system, indicated generally by the reference numeral 21, is provided for supplying a charge to the combustion chambers 15. This induction system 21 includes an air inlet device 22 which has an atmospheric air inlet 23 that draws air from the atmosphere. A filter element 24 may be provided in the air inlet device 22. The air inlet device 22 delivers the air through a passageway 25 to a throttle body 26 upon which a throttle valve 27 is supported. An bypass passage 28 extends around the throttle body 26 and has a flow controlling bypass valve 29 positioned therein.

The throttle body 26 and bypass passageway 28 deliver the intake air to a plenum portion 31 of an intake manifold, indicated generally by the reference numeral 32. The intake manifold 32 has individual runners 33 which serve cylinder head intake passages 34 that terminate in intake valve seats in the cylinder head recess 15. Poppet-type intake valves 35 control the opening and closing of these valve seats and the communication of the induction system 21 with the combustion chambers 15. The intake valves 35 may be opened and closed in a known manner, for example via an overhead mounted intake camshaft 36, which is driven at one-half crankshaft speed by any suitable drive mechanism.

In addition to the air charge supplied by the induction system 21, there is also supplied a fuel charge. In the specific embodiment illustrated, the charge former comprises a manifold-type fuel injector 37 which is mounted in the cylinder head assembly 14 and which sprays into the cylinder head intake passage 34. The fuel injector 37 is of the .electrically operated type and includes a solenoid operated valve which is energized from an ECU, shown schematically and indicated by the reference numeral 38, in accordance with a control strategy as will be described.

The fuel injector 37 receives fuel from a fuel supply system that includes a remotely positioned fuel tank 39. The fuel tank 39 feeds a supply conduit 41 in which a filter 42 is provided. The filter 42 is provided upstream of a high-pressure fuel pump 43 that delivers pressurized fuel to a fuel rail 44. The fuel rail 44 in turn supplies fuel to the fuel injector 37 through a supply 45.

The pressure at which the fuel is supplied to the fuel injectors 37 is controlled by a pressure regulator 46 that communicates with the fuel rail 44. This pressure regulator regulates pressure by dumping excess fuel back to the fuel tank 39 through a return line 47.

In addition to controlling the timing and duration of injection of fuel by the fuel injectors 37, the ECU 38 also controls the firing of spark plugs 48. The spark plugs 48 are mounted in the cylinder head assembly 14 and have their gaps extending into the cylinder head recesses 15.

The burnt charge from the combustion chambers 15 is discharged through an exhaust system, indicated generally by the reference numeral 49. This exhaust system 49 includes exhaust passages 51 formed in the cylinder head assembly 14. These cylinder head exhaust passages 51 are controlled by poppet-type exhaust valves 52. The exhaust valves 52 are operated by means that include an exhaust camshaft 53 that is mounted in the cylinder head assembly 14 and which, like the intake camshaft 36, is driven at one-half crankshaft speed by a suitable timing mechanism.

The cylinder head exhaust passages 51 communicate with an exhaust manifold 54 which collects the exhaust gases and delivers them to a three way catalytic converter 55 in which a three-way catalyst is provided. The catalytic converter 55, in turn, communicates through a tailpipe 56 and muffler 57 to the atmosphere for the discharge of the treated exhaust gases.

The engine 11 is also provided with an exhaust gas recirculation (EGK) system. This exhaust gas recirculation system includes an exhaust gas recirculating conduit 58 that extends from the exhaust system 49 between the catalytic converter 51 and muffler 57, and the intake manifold plenum chamber 31. The amount of exhaust gas which is recirculated is controlled by an EGK valve 59 which, in turn, is controlled by the ECU 38.

The engine 49 is also water cooled, and to this end, the cylinder block 12 and cylinder head assembly are provided with cooling jackets 61 through which a liquid coolant is circulated. This liquid coolant is circulated by a coolant pump (not shown), and also passes through a heat exchanger which is also not illustrated. Like the other portions of the engine already described, the cooling system may be of any conventional type, and for that reason, further description of it is not believed to be necessary to permit those skilled in the art to practice the invention. This invention relates primarily to the control methodology and engine system measurement. This construction will now be described by particular reference still to FIG. 1.

The engine 11 is provided with a number of sensors for sensing engine running and ambient conditions. Among these is a crankcase position sensor which is comprised of a timing gear 62 that rotates with the crankshaft 18 and which cooperates with a pulser coil 63 that outputs pulse signals to the ECU 38. These pulse signals provide an indication of not only the angle of the crankshaft 18, but also by counting the number of pulses and dividing them by the unit of time, it is possible to measure the rotational speed of the crankshaft 18.

There is also provided a sensor for ambient air pressure, and this pressure sensor, indicated by the reference numeral 64, is provided in the air inlet device 22 downstream of the filter element 24. In addition, an air flow meter, for example an electrically heated wire-type of device 65, is provided in the intake passage 25 for measuring the total mass air flow to the engine.

The throttle valve 27 has associated with it a throttle position sensor 66. This sensor 66 provides the ECU 38 with information regarding operator demand or load on the engine.

Intake manifold vacuum, another indicator of engine load, is measured by a pressure sensor 67 which is disposed in the intake manifold 32, and specifically its plenum chamber portion 31.

In accordance with an important feature of the invention, in-cylinder pressure is also sensed by an in-cylinder pressure sensor 68 which is mounted in the cylinder head 14 in communication with the combustion chamber recess 15 formed therein.

A temperature sensor 69 is also mounted in the cylinder head assembly 14 and senses the engine temperature. There may also be provided in the cylinder head a knock sensor that senses knocking conditions by measuring vibrations of the engine, as is well known in this art.

In order to permit feedback control of the engine to maintain the desired fuel-air ratio, an oxygen sensor 71 is provided in the exhaust manifold 54 in close proximity to the cylinder head exhaust passages 51.

The catalytic converter 55 is provided with a converter temperature sensor 72 that senses the temperature in the catalytic converter and that of the catalytic bed therein. A temperature sensor 73 is also positioned in the exhaust pipe 56 for sensing exhaust temperature downstream of the converter 55.

Finally, the control for the engine includes a main switch 74 that is operative to switch on and off not only the ECU 38, but also the ignition system controlled by it for firing the spark plugs 48. Also, the operation of the fuel injector 37 is discontinued when the main switch 74 is turned off.

The engine IMEP and torque measurement system and how these measurements are utilized to control the engine will now be described. As has been previously noted, because of the fact that combustion begins generally before top dead center, under some if not all portions of running, the combustion pressure acts against rather than with the piston. Therefore, if shaft torque is computed only from combustion pressure after top dead center, then the computed values will be significantly higher than the actual value.

Also, the beginning of combustion is varied both with spark and diesel engines by varying, respectively, the spark and injection timing. Thus, combustion pressure signals only measured after top dead center will not account for variations in the timing of beginning of injection or a beginning of combustion.

Therefore, in accordance with an important feature of the invention, the engine output is measured by detecting combustion chamber pressure at a crank angle that is before top dead center at a time between the end of the exhaust stroke and the beginning of the compression stroke. In addition, subsequent measurements, as will be described, are taken, and then these are utilized for determining the engine IMEP, and also controlling the engine, as will be described.

The position where the first reading is taken is at the ending of the exhaust stroke and the beginning of the compression stroke, before top dead center in the vicinity of top dead center in a four-cycle engine, is different for a two-cycle engine. Specifically, in four-cycle engines, after firing, the exhaust stroke begins from the bottom dead center and continues until the top dead center, where the pressure in the combustion chamber has dropped to near atmospheric pressure. In the intake stroke just past top dead center, the pressure is maintained at near atmospheric levels as the fresh air is being introduced. Just past the succeeding bottom dead center, the pressure begins to gradually increase on the compression stroke. Therefore, the pressure in the combustion chamber needs to be taken at a point that is within the range where the pressure in the combustion chamber is at its lowest level and near atmospheric pressure.

In two-cycle engines, on the other hand, after firing, the piston descends and the pressure declines. When the exhaust port is opened, the pressure in the combustion chamber drops further. When the scavenging port subsequently opens, new air is introduced, and the pressure is near atmospheric. The exhaust port remains open at the bottom dead center, and as the piston rises, the scavenging port is closed, and then the exhaust port is closed. Compression then begins, with the pressure gradually rising as a result. Thus, where the term "between the end of the exhaust stroke and the beginning of the compression stroke" is referred to, that is the interval after the exhaust port has opened and exhausting has begun, and when the scavenge port is opened and after the intake air has begun.

Thus, in accordance with the invention, the pressure is detected at a plurality of points during each combustion cycle at a crank angle between the conclusion of the exhaust stroke and the beginning of the compression stroke, at a crank angle that is near but before top dead center, and crank angles near but after top dead center. The IMEP may then be computed from the following first order approximation equation:

$$IMEP = C + C1(P1-P0) + C2(P2-P0) + \ldots + CN(PN-P0) \quad (1)$$

The values C, C1, C2, ... CN are predetermined constants. The point P0 is the point where the combustion chamber pressure is at atmospheric pressure or near atmospheric pressure. This is a point near the bottom dead center (BDC) crank angle, as will be described. In order to correct the offset output, this value is detected from the subsequent pressure readings P1 through PN. The P1 reading is taken at the crank angle which is near but before top dead center, and P2 through PN are combustion chamber pressures at crank angles that are near top dead center, but after it. Thus, it is possible by using a simple first order approximation equation to accurately compute in a short time period a value that is approximately the actual value. Thus, this value can be utilized to control ignition timing for the engine or air-fuel ratio to improve engine response and inhibit output fluctuations by accurately following the operating state, particularly when EGR and/or lean burn is employed.

Figure 2:
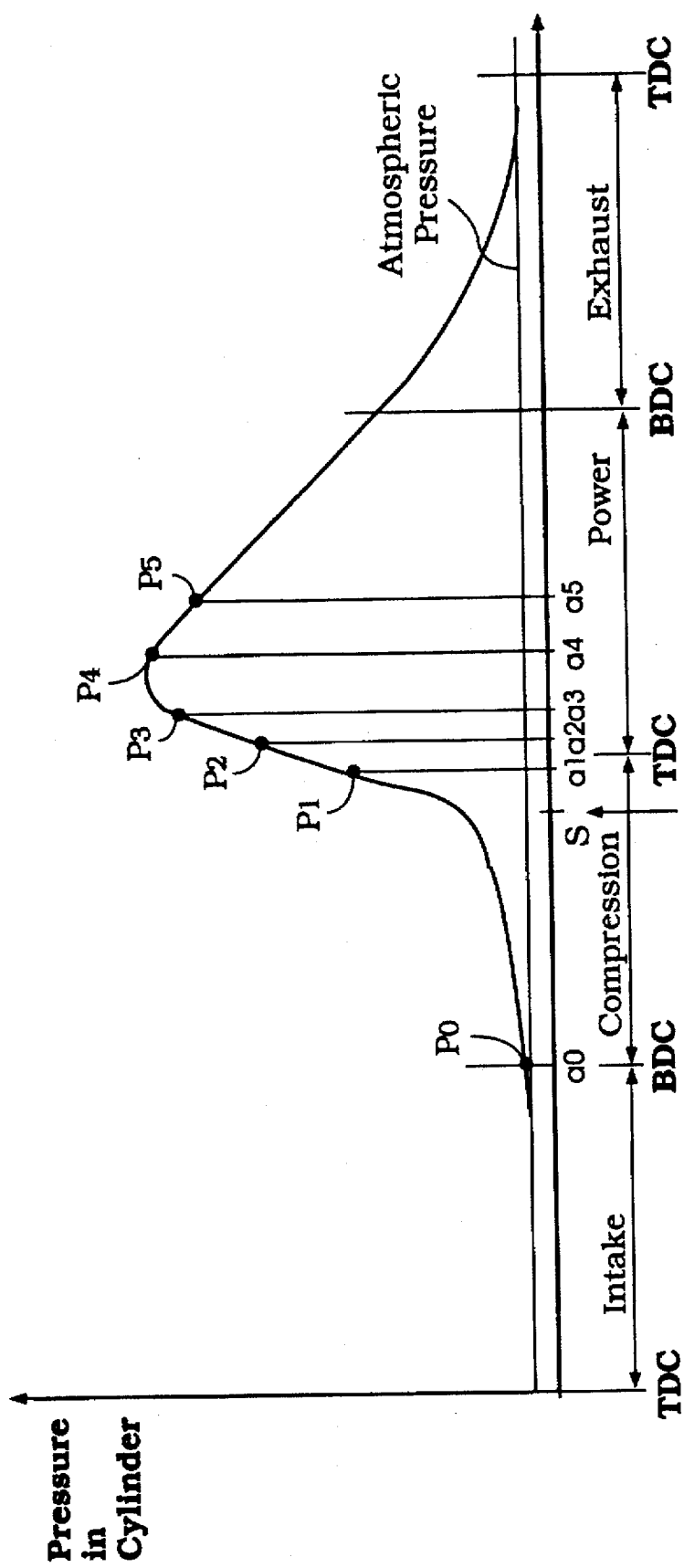
FIG. 2 is a pressure time curve of the engine shown in FIG. 1 during a complete cycle of operation, and shows the various sampling points at which in cylinder pressures are taken in accordance with this embodiment of the invention.

These points of reading may be best understood by reference to FIG. 2, which is a pressure crank angle trace for the engine shown in FIG. 1, under a particular running condition. It is seen that the reading P0 is taken at bottom dead center position, which can be characterized as the point aO, and this is the point where the piston crosses over from the end of the intake stroke to the beginning of the compression stroke. It should be noted that the actual valve timing will, of course, vary slightly from the opening at top dead center and closing at bottom dead center, so as to allow for the inertial effect.

One further reading P1 is taken of pressure at a point that is before top dead center, but after firing of the spark plug, as shown in FIG. 2. Four additional readings (P2–P5) are taken, two of which occur before the pressure in the cylinder reaches it peak pressure, and these are taken immediately after the top center position. The two further readings which are taken, are taken after peak pressure, but well before the piston reaches its bottom dead center position and hence, are taken sometime after top dead center, with the last reading being taken at approximately one-half of the piston stroke.

These readings have been found to be very effective in permitting the measurement and a simple arithmetical equation to be utilized to calculate, IMEP and/or engine torque, and thus, control the engine during its running through a relatively simple program. The way in which the running control is accomplished will now be described by reference to FIG. 3, which depicts a control routine for controlling the engine 11.

Figure 3:
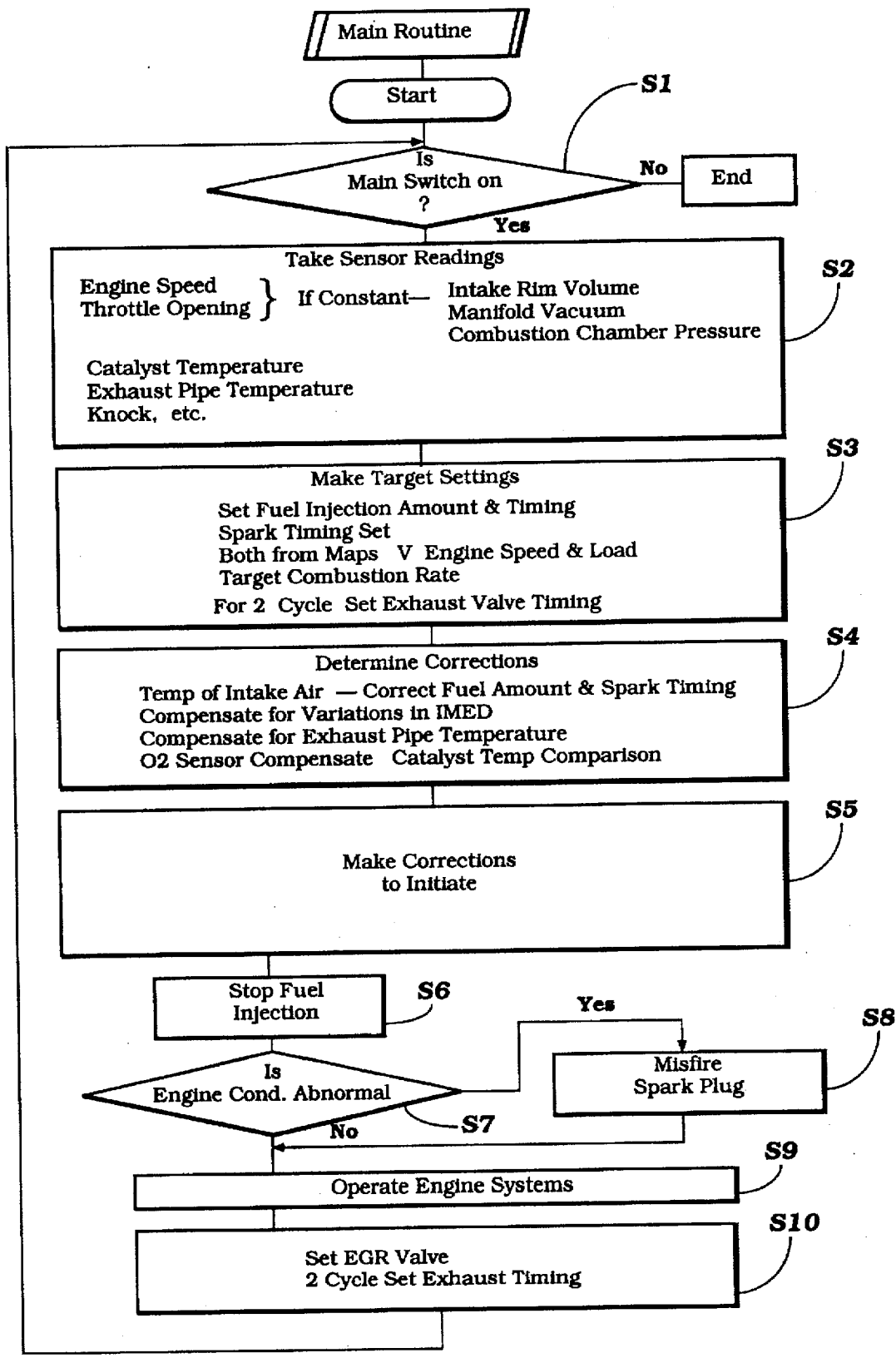
FIG. 3 is a graphical view showing the main control routine for operating this embodiment.

Referring first to FIG. 3, this is a flow chart that shows the main control routine for controlling the various operations of the engine and the computation of the shaft torque and combustion rate in the combustion chamber 15. The program starts and then moves to the step S1 to determine the condition of the main switch 74 to determine if it is on or off. If the main switch is not on, the program ends.

If, however, at the step S1 the main switch is determined to be on, then the program moves to the step S2. At the step S2, the readings from the various sensors are taken, i.e., the engine speed is determined from the output of the pulser coil 63 by counting the number of pulses of this coil in a given time period, as aforenoted; the throttle opening, determined by the position of the throttle position sensor 66 is also taken.

If, after taking the engine speed and throttle opening it has been determined by comparing with previous values in a given time that these are constant, then the amount of intake air volume flowing is taken from the flow sensor 65. Under this condition, the amount of intake air will be indicative of the actual engine load. Also, or alternatively, the intake manifold vacuum determined by the sensor 67 may be employed as a measurement of load. In addition, other factors, such as engine temperature from the sensor 69, knock conditions as sensed by the knock condition sensor, catalyst temperature form the temperature sensor 76, exhaust pipe temperature from the temperature sensor 73 and other values can be taken. These other values may include the determination of the adequate amount of lubrication in the engine, etc.

If the engine speed and throttle opening are also found to be constant, then the combustion camber pressures as read at the points P0, P1, P2, P3, P4 and P5, respectively.

Having taken readings noted at the step S2, the program moves to the step S3 so as to read a map to obtain the ignition timing data, air fuel ratio, or fuel injection amount, fuel injection timing and control of EGR valve 59. These are read from a map that is based primarily on engine load either determined by throttle position or intake manifold vacuum and engine speed. The air fuel ratio data is obtained form a three-dimensional map and from it, it is possible to determine the necessary amount or volume of fuel injection.

If the control system is employed with a two-cycle engine having an exhaust control valve for varying the effective compression ratio, at the step 3, the timing for the opening and closing of the exhaust control valve may also be determined from maps based upon engine speed and engine load.

Since the spark timing is set at the step S3 for the engine conditions, this will also set the target combustion rate.

The program then moves to the step S4 so as to adjust the various timings based upon other engine or ambient measured conditions. These corrections may include a correction based upon the intake air temperature. If the intake air is at a high temperature, its density is lower and, hence, the amount of air inducted would be less than indicated by the air flow meter. Therefore, a reduction in fuel amount may be made based upon temperature of the intake air. Also, since combustion tends to be delayed, there may also be made a correction which would slightly advance engine timing.

Figure 4:
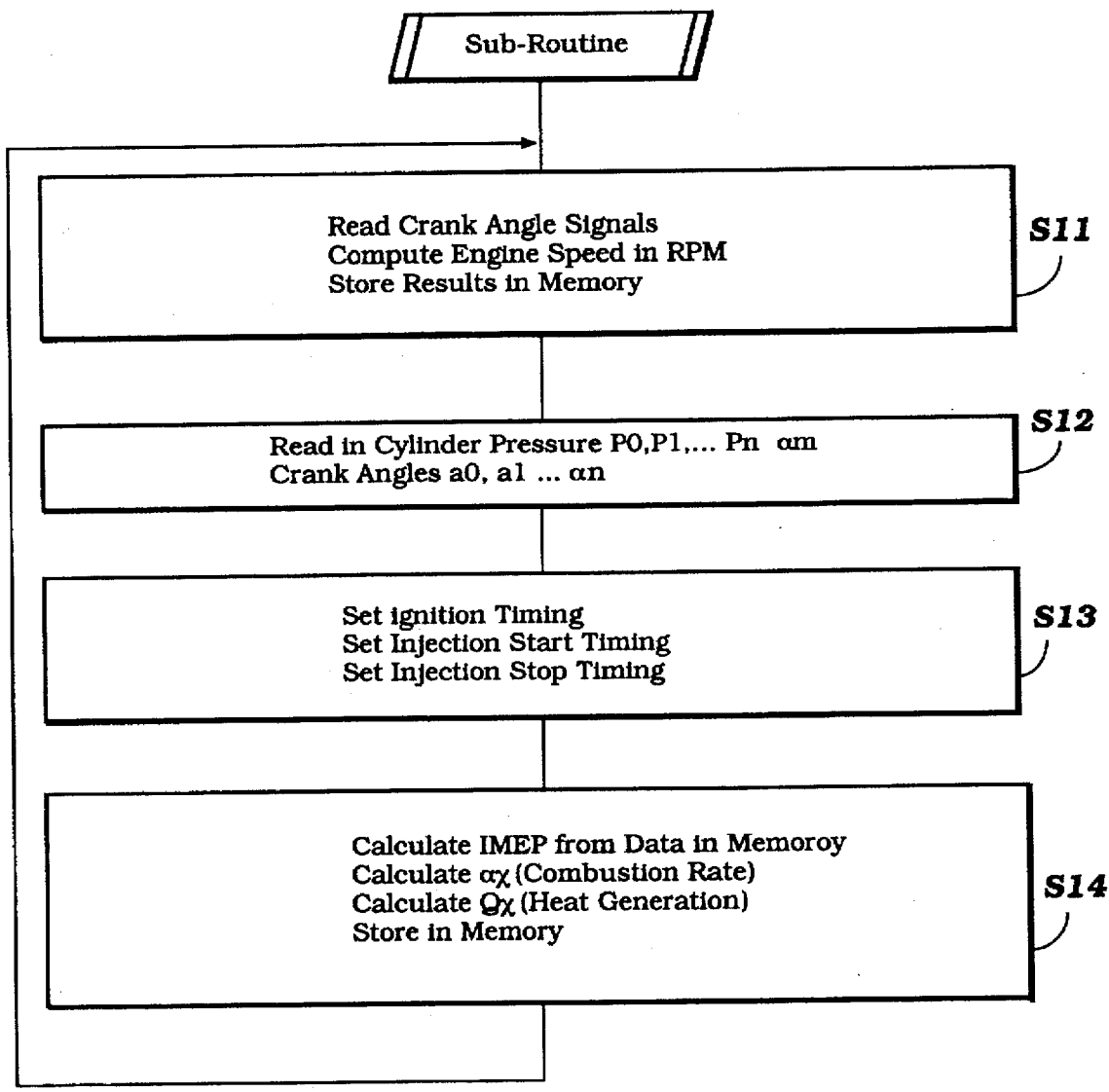
FIG. 4 is a block diagram showing a sub-routine utilized with the main control routine shown in FIG. 3.

In addition, if there is a variation in the IMEP or engine torque, then the program uses a subroutine as shown in FIG. 4 and which will be described later by reference to that figure, to compensation for the variations in IMEP. These adjustments are made only if the amount of fluctuation exceeds a certain amount from the desired IMEP value. These adjustments may be made to increase the amount of fuel injection or decrease the amount of EGR. The more the fuel injection amount is increased or the more the amount of EGR is reduced, the lower will be the IMEP fluctuations. This is because, when the engine is running in a lean burn load or when there are high amounts of EGR, the likelihood of engine fluctuations occur.

However, increasing the amount of fuel injection or decreasing the amount of EGR can cause fuel economy to suffer. Therefore, feedback control utilizing absolute value for IMEP can be advantageously used. The correction for the absolute value of IMEP can be performed by computing the IMEP from pressure information as aforenoted and storing this in memory. In addition, a comparison is made with the instantaneous IMEP with that from the previous cycle. If it has increased, then corrected values for ignition timing and fuel injection amount and EGR are substituted for the previous values in the memory which are either slightly increased or decreased based upon the correction. On the other hand, if the IMEP has decreased over the previous cycle as recorded, then a slight increase or decrease opposition from those previously stated are performed and the new values added to the memory. Obviously, if there are no changes in the IMEP, then the values for ignition timing, amount of fuel injection and EGR adjustment remain in the memory uncorrected. On initial start-up, the IMEP in the memory is set at zero.

The effect on combustion rate which is calculated as will be described later will also now be described. Up to the point where the crank angle reaches top dead center the combustion rate is stable, for example, at 2.5% to 30%. Thus, at the step S3, the combustion rate computed from combustion chamber pressure data is compared to the target combustion rate in the step S3 and, based upon the difference, corrections are made in the settings of the parameter, such as ignition timing, amount of fuel injection and fuel injection timing.

In addition, the aperture of the EGR valve and also the exhaust valve timing with two-cycle engines can be varied. To lower the combustion rate, compared to the target combustion rate, the timing of ignition is advanced, fuel injection timing is advanced and the fuel injection amount is increased. The control would then advance the exhaust timing and decrease the aperture of the exhaust passage. The advance timing of fuel injection is primarily utilized with diesel engines because this is the equivalent of advancing the timing of spark in a spark engine. On the other hand, if the combustion rate is higher than desired, then adjustment opposite those mentioned are made.

Also, at the step S4, the exhaust pipe temperature form the sensor 73 is also utilized to make certain compensations. That is, if the exhaust pipe temperature is low, then the pressure wave in the exhaust pipe is slowed and, .thus, exhaust pipe pulse tuning to improve engine output will not be possible. However, it is possible to increase the exhaust gas temperature by either delaying ignition timing or making the air fuel ratio richer if it is below a certain ratio, such as 17 or 18 to 1.

On the other hand, if the exhaust pipe temperature is higher than the required temperature, then the ignition timing is advanced or the air fuel ratio is decreased so as to bring the temperature to the desired temperature.

With two-cycle engines, the lower exhaust pipe temperature can be compensated for by advancing the exhaust timing the higher temperature can be compensated for by delaying the exhaust timing.

The output of the oxygen sensor 71 is also utilized to make corrections in the air fuel ratio to bring the ratio into the desired ratio. This may be done by adjusting the bypass control valve 29 so as to permit more air to flow in the system if the air flue ratio is rich, or less air if it is lean.

Also, if the catalyst temperature is not at the desired temperature, corrections can also be made to either heat or cool the catalyst, depending upon which side of the desired temperature the actual temperature is. That is, if the catalyst temperature sensed by the sensor 72 is low, then the ways of increasing exhaust gas temperature previously noted are employed and the same is true with respect to low catalyst temperature.

Once the corrective factors have been determined at the step S4, the program then moves to the step S5 so as to apply the compensation amounts actually initiate the corrections that have been determined to be necessary from the comparison of steps S4 and S5. That is, the basic values determined at step S3 are modified by the corrective factors called for at step S4.

The step S5 deal with the initiation of various items, such as exhaust vale timing, EGR amount, spark timing and fuel injection initiation. However, the duration of fuel injection is controlled at the step S6 wherein the amount of fuel to be injected determined by using the data from the steps S3 and S4 are utilized so as to determine the crank angle at which injection timing will be stopped.

Then the program moves to the step S7 so as to determine from the readings which have been taken whether or not the engine is operating in an abnormal condition. That is, the readings at the step S2 are compared for such factors as engine speed to determine if it is excessive, engine temperature to determine if it is too high, engine knock, low oil or other abnormalities. If the engine is determined to be operating abnormally, the program moves to the step S8 to initiate protective action.

If the engine is designed to be operated in a limp home mode, one way this can be done is that the spark plugs may be misfired so as to control or limit the engine speed. If, however, there is an abnormal condition, then the ignition can be totally disabled.

However, if at the step S7 it is determined that there are no abnormalities, the program moves to the step S9 so as to initiate the various timing controls which have been determined at the step S5. Then, the program moves to the step S10 so as to set the EGR valve to the correction value after the fuel injection and spark timing and other parameters have been set. Also, with a two-cycle engine, the exhaust control valve opening timing also is adjusted at this step. The program then repeats.

The subroutine of FIG. 4 will now be described in detail. This subroutine is inserted into the main routine of FIG. 3 and is utilized as an independent way of determining from the measured data the change in IMEP from cycle to cycle and also the combustion rate qx and the heat generation QX so as to permit adjustment in these parameters. Referring to this subroutine, at the first step S11, the basic crank angle signals from the sensor 63 are read and compared with time so as to compute the engine speed and rpm based on the number of pulses in a given time period as previously noted. This engine speed is then stored in a memory.

At the next step S12, the combustion chamber pressure data is read into the memory, this being based upon the readings at the points a0, a1, a2, a4, and a5 as seen in FIG. 2. Then at the step 13 the various basic control amounts are set in the memory based upon the map data previously referred to. These include the time of firing of the spark plug, the initiation timing for beginning of fuel injection, and the stop fuel injection timing.

Then the program moves to the step S14 so as to computer the IMEP and compare it with the previously computed IMEP from the previous cycle and store the new reading in memory. The IMEP is based upon the combustion chamber pressure reading P0–P5 at the sixth crank angle a0–a5 per combustion cycle in accordance with the following equation, as previously noted:

$$IMEP=C+C1(P1-P0)+C2(P2-P0)+ \ldots +CN(PN-P0)$$

As previously noted, C, C1, C2 ... CN are constants based upon a number of samplings. It also should be noted that when the pressure P1 is sampled prior to top dead center and around the time of ignition, it is possible to improve the accuracy of the IMEP computation. The sample at this time would be negative and the sign of the coefficient for the after top dead center signals would be positive and thus the work would be the sums of negative and positive work. In a specific embodiment as shown in FIG. 2, the points $a_0$ to $a_5$ are as follows:

a0=BDC
a1=15° after BDC
a2=TDC
a3=15° after TDC
a4=45° after TDC
a5=75° after TDC
a6=105° after TDC These crank angles are fixed through the entire engine operating ganged from low-load to high-load and from low-speed to high-speed. As is typical, the ignition timing is varied with load changes. For example, in a preferred embodiment, at low loads, the timing of firing of the spark plug may be 10° before top dead center. AT mid-range load it is 25° before top dead center and at full loads it is 5° before top dead center. Therefore, in the low and full-load range, the reading a1 is before ignition timing at low-load and full-load and at mid-range it is after ignition timing. With such an arrangement, the IMEP may be calculated by eliminating the C1 (P1–P0) term.

The combustion rate is, on the other hand, computed at the time period up to A3, i.e., 15° after top dead center. Alternatively, the reading at A1 can be set to 3° before top dead center, and then all readings can be utilized in computing the IMEP, and the combustion rate can be computed over the full load range up to top dead center.

As has been noted, it is also possible to determine the combustion rate for the engine based upon the pressure readings. Combustion rate can be determined by the following equation:

$$qx=b+b1(P1-P0)+b2(P2-P0)+ \ldots bn(PN-P0).$$

Again, the values of the b, b1, b2 ... bn are values that are determined by experimental data based upon a number of samples. Again, the pressure is adjusted for the pressure P0 which is approximately atmospheric. Thus, like IMEP, combustion rate can be simply calculated from a first order equation and this can also be run from cycle to cycle. Thus, it is possible to accurately predict the engine operating state and change the controls to maintain the desired amount. Furthermore, this method can be utilized to prevent or reduce the generation of NOX emissions caused by rapid advance of combustion.

Another way to compute the combustion rate is to use the heat generated by two pressure measurements, the pressure different $\delta P$ between the two measure points and the volume different $\delta V$ in the volume of the combustion chamber. This can be done in accordance with the following equation for determining heat generation:

$$Qx = \frac{AR}{(K-1)} \times \left( \frac{K+1}{2} \times \delta P \times \delta V + K \times (P-Po) \times \delta V + V \delta P \right)$$

The specific pressure measurement point up to where combustion rate is measured should be selected as the crank angle where combustion is nearly complete. Similarly, a crank angle near the point of ignition would also be selected as a pressure measurement point. The calculation of the foregoing amount of heat generated Qx is performed by summing the values determined for each pressure measurement point and with regard to the interval between initial pressure measurement point in the specific pressure measurement point. Then the combustion rate is determined by summing for the foregoing Qx and dividing. That is, combustion rate equals qx divided by all of the heat x.

It may be possible to obtain more accurate IMEP calculations using only one pressure detection point A1 before top dead center if the pressure detection point A0 used for correcting the offset due to drift is excluded. It is also possible to have two or three detection points before top dead center. This enables a more accurate calculation of the workload and more accurate calculation of the IMEP. Therefore, if the number of detection points is limited, it is possible to use larger teeth on the ring gear to detect crank angle and still detect the crank angle inexpensively and with a high degree of precision.

It is also possible to divide the load ranges up into low loads, mid loads, and full loads, and the engine rpm into low-speed, mid-range, and high-speed, and use nine types of data AON-ASN, CON-CSN, where N is a number from 1 to 9 in order to compute the IMEP.

Also, by comparing the change in IMEP with that of the previous cycle, the amount of fuel injection, ignition timing, and the amount of EGR can be controlled using the deference to set the operating parameters. By decreasing the amount of fuel supplied or increasing the amount of EGR, it is possible to obtain better fuel economy or improved emissions, but combustion is liable to become unstable. In the methods of control used in the prior art, these output fluctuations were held constant by controlling the air-fuel ratio and the amount of EGR to preset values. However, the effects on such changes differ according to the usage, and it is necessary that these settings have a reasonable degree of latitude in order to maintain constant running with the prior art arrangements. With the present invention, however, it is possible to manipulate these values during engine running to obtain better control and less fluctuation in running. This is particularly important because of the measurement of the IMEP using a value before top dead center.

Figure 5:
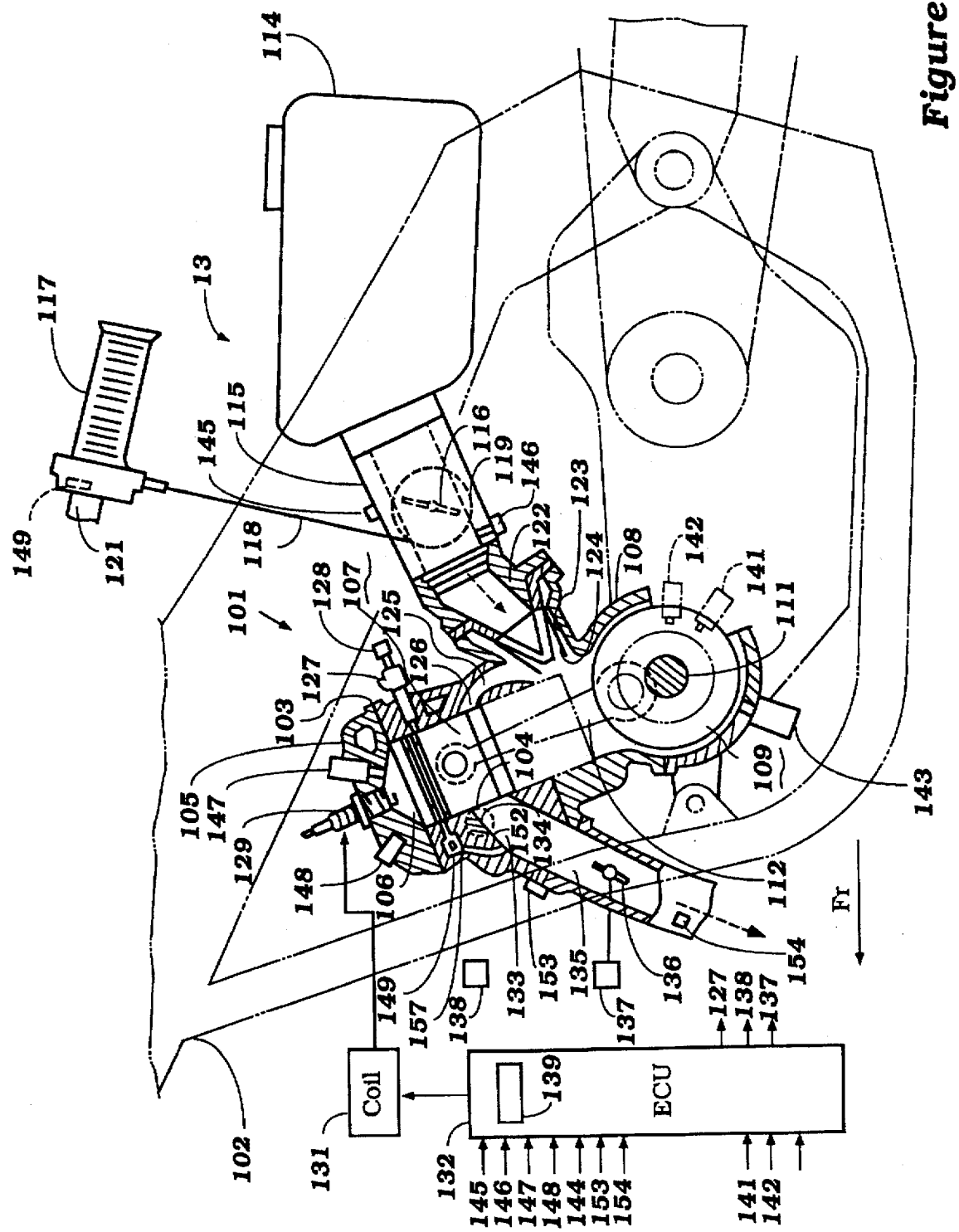
FIG. 5 is a partially schematic cross-sectional view of a portion of a two-cycle, crankcase compression, internal combustion engine constructed and operated in accordance with an embodiment of the invention. This view also shows the engine installed in a motorcycle, which is shown partially and in phantom.
Figure 6:
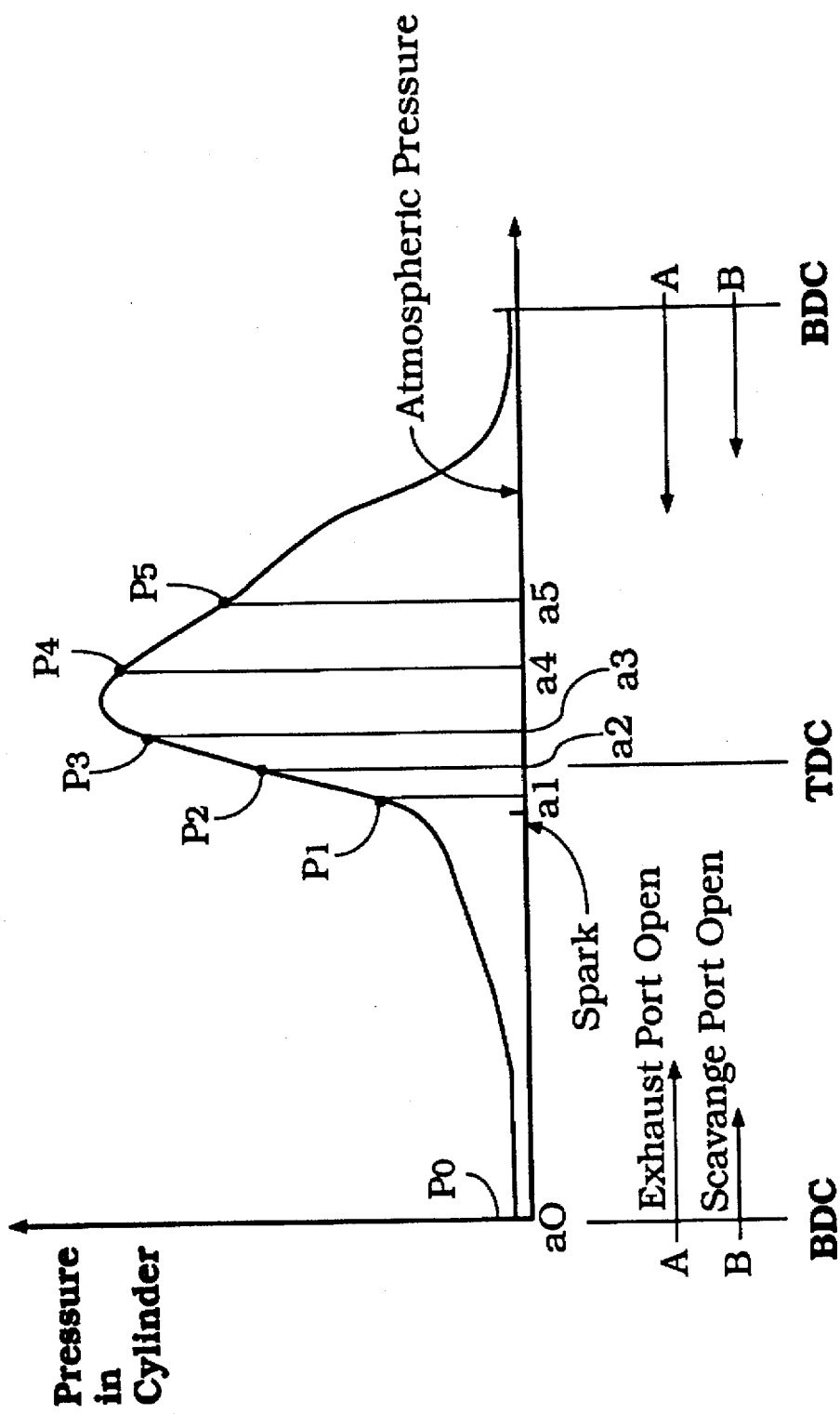
FIG. 6 is a pressure time curve for this embodiment, showing the in-cylinder pressure during a single cycle of operation, and showing the sampling points with this embodiment.

In the described methodology, reference has been made to the application of the principle to two-cycle engines, and particularly reference has been made to the control of the exhaust control valve timing with such engines. Although it is believed that the foregoing description will permit those skilled in the art to understand how the invention can be practiced in conjunction with two-cycle engines, such an embodiment is illustrated in FIGS. 5 and 6 and will now be described by particular reference to those figures.

In this embodiment, one cylinder of a multi-cylinder two-cycle internal combustion engine is shown in cross section, with the engine being identified generally by the reference numeral 101. Like the previously described embodiment, the engine 101 is adapted to be utilized in a variety of applications, such as in motor vehicles, and a motorcycle application is shown. The motorcycle is illustrated partially in phantom and is identified by the reference numeral 102. Again, however, the invention also may be utilized in conjunction with automotive or other vehicular applications and/or in watercraft such as in outboard motors or inboard/outboard propulsion units for watercraft.

In this embodiment the engine 101 includes a cylinder block, indicated generally by the reference numeral 103, in which one or more cylinder bores 104 are formed. The upper ends of these cylinder bores 104 are closed by a cylinder head assembly 105 that is affixed to the cylinder block 103 in any known manner. The cylinder head 105 is formed with individual combustion chamber recesses 106 that cooperate with pistons 107 that are slidably supported within the cylinder bores 104, and the cylinder bores 104, so as to form the combustion chambers of the engine.

The end of the cylinder bore 104 opposite that closed by the cylinder head 105 is closed by a crankcase member 108 and defines a crankcase chamber 109 in which a crankshaft 111 is rotatably journaled in a known manner. The piston 107 is connected to a throw of the crankshaft 111 through a connecting rod 112.

As is typical with two-cycle engine practice, the crankcase chambers 109 associated with each of the cylinder bores 104 are sealed from each other. An intake charge is delivered to these crankcase chambers 109 by means of an induction system, indicated generally by the reference numeral 113. This induction system 113 includes an air inlet device 114 that draws atmospheric air and delivers it to a throttle body assembly 115. A throttle valve 116 is rotatably journaled in the throttle body assembly 115 and is operated by a twist-grip throttle control 117. A wire actuator 118 connects the throttle control 117 to the throttle valve 116 via a throttle pulley 119 that is affixed to the shaft of the throttle valve 116. The twist-grip throttle 117 is mounted on a handlebar assembly 121 of the motorcycle in a manner well known in the art.

The throttle body 115 is connected to an intake manifold 122, which serves intake ports 123 that communicate with the crankcase chambers 109. Reed-type check valves 124 are provided in these intake ports 123 and permit the air charge to flow into the crankcase chambers 109 when the pistons 107 move upwardly and close to preclude reverse flow when the pistons 107 move downwardly.

The charge thus compressed in the crankcase chambers 109 is transferred to the combustion chambers through one or more scavenging passages 125 that communicate with the cylinder bore 104 through scavenge ports 126. This charge is then further compressed in the combustion chambers 106.

A fuel injector of the direct-injection type 127 is mounted in the cylinder block 103 and sprays into the combustion chamber 106 at a timing, as will be mentioned. The fuel injector 127 receives fuel from a fuel rail 128, and this fuel pressure is regulated in a manner previously described. The fuel injectors 127 are electronically triggered and use a solenoid that operates an injector valve of a known type.

The charge thus delivered into the combustion chamber is then fired by a spark plug 129 mounted in the cylinder head 105. The spark plug 129 is fired by an ignition circuit 131, which is in turn controlled by an ECU 132. The charge which is ignited in the combustion chambers 106 will burn and expand and drive the pistons 107 downwardly. They then open an exhaust port 133 formed in the cylinder block 105 to permit the exhaust gases to exit. An exhaust control valve 134 of a known type is journaled in the exhaust passage 133, and its angular position controls the timing of the opening and closing of the exhaust port, as is well known in this art.

The exhaust passage 133 communicates with an exhaust manifold 135, which in turn communicates with a suitable exhaust system for discharge of the exhaust gases to the atmosphere in a known manner. As is typical with two-cycle engine practice, the exhaust manifold 134 may have provided in it an exhaust control valve 136 which is actuated by a servomotor 137 so as to control the effect of pressure back pulses in the exhaust system so as to fine tune the performance of the engine. The exhaust timing valve 134 is also controlled by a servomotor, this being indicated generally by the reference numeral 138.

As has been noted, the control for various engine functions utilizes the ECU 132. The ECU has a CPU 139 which receives certain inputs from sensor for the engine and provides the engine control in a manner similar to that previously described. These sensors include basic engine sensors, such as a crank angle sensor 141 that cooperates with teeth on the crankshaft 111 to provide a crank angle output signal. In addition, an rpm sensor 142 counts the teeth on this gear in relation to time to provide an engine speed signal.

Crankcase pressure is also measured by a pressure sensor 143. As is known in this art, crankcase pressure at certain crank angles is a very accurate indication of actual engine air consumption.

There is provided a throttle control position sensor 144 that cooperates with the twist-grip throttle 117 to provide a signal indicative of operator demand. In addition, the position of the throttle valve 116 or its pulley 119 is determined by a throttle position sensor 145.

Intake air pressure is sensed by a pressure sensor 146 mounted in the throttle body 115 downstream of the throttle valve 116.

An in-cylinder pressure sensor 147 is mounted in the cylinder head 105 and measures the pressure in the combustion chamber 106 in the manner previously described. Furthermore, there is provided a knock sensor 148, which is also mounted in the cylinder head 105 and which outputs its signal to the ECU 132, and specifically its CPU portion 139. The inputs of the various sensors are indicated in FIG. 5 by placing their sensor reference characters next to the arrows leading into the ECU.

The engine 101 is further provided with an oxygen sensor, indicated generally by the reference numeral 149. This oxygen sensor 149 is positioned in a chamber 151 that communicates with the combustion chamber 106 and which has a discharge passage 152 that communicates with a cylinder block exhaust passage 133 so as to sense the combustion products burned in the engine and determine the air-fuel ratio.

In the exhaust system there is further provided an exhaust pipe back pressure sensor 153 and an exhaust temperature sensor 154.

Of course, those sensors that are described in conjunction with this and the preceding embodiment, except for the in-cylinder pressure sensor, may be of any character, and any number of such sensors for sensing such desired conditions may be employed for engine control.

The basic control routine is as already described; however, with a two-cycle engine there is another timing arrangement by which the pressures are sensed, and this may be understood best by reference to FIG. 6. Generally, the concept is the same as that previously described. That is, it is desirable to measure the pressure in the combustion chamber at a time when the exhaust cycle is near its completion and the scavenge port has been opened so that the pressure PO will be close to atmospheric. As with a four-cycle engine, this pressure reading may be taken at bottom dead center.

As may be seen in FIG. 6, the complete cycle operates only over one revolution of the engine with a two-cycle engine, rather than every two rotations as with a four-cycle engine. However, the general principle is the same as that previously described, and thus only a summary description of FIG. 6 is believed necessary to permit those skilled in the art to practice the invention.

The exhaust port and scavenge port timings are depicted in FIG. 6 as the reference characters A and B, respectively. With a two-cycle engine, the pressure P0 will be slightly greater than actually atmospheric pressure due to the exhaust tuning and the like. However, the principle is the same as that already described. In a two-cycle engine, the timing at the point a0, although shown at bottom dead center in FIG. 6, miry actually occur maybe somewhat later than a four-cycle engine, such as 135° before top dead center. Also, the a5 reading is advanced relative to that of a four-cycle engine and may be 90° after top dead center. However, the pressure readings P1, P2, and P3 are all taken before peak pressure, and the reading P1 is taken before top dead center, while the pressure P2 may be taken at top dead center.

In view of the foregoing description of the control strategy with respect to a four-cycle engine and the reference to the relationship to the components of the two-cycle engine, such as the exhaust port timing valve 134 and the exhaust pressure valve 136, further description of the control strategy is not believed to be necessary.

Obviously, the foregoing description is that of preferred embodiments of the invention, and various .changes may be made without departing from the spirit and scope of the invention. For example, the invention has been described in conjunction with either manifold injection in a four-cycle engine .or direct injection with a two-cycle engine, but the injection locations may be reversed. Also, other forms of charge formers such as carburetors may be employed, rather than fuel injectors. Thus, the spirit and scope of the invention will be determined by the appended claims, and the foregoing description is exemplary only of preferred embodiments.

What is claimed is:

1. An internal combustion engine having a combustion chamber which varies cyclically in volume during engine operation from a maximum volume BDC condition and a minimum volume TDC condition, an induction system for delivering an intake charge to said combustion chamber, means for initiating combustion in said combustion chamber, and an exhaust system for discharging exhaust gases from said combustion chamber, a pressure sensor for sensing pressure in said combustion chamber at at least certain engine output shaft angles, and means for taking a pressure reading at a time between the end of the exhaust stroke and the beginning of the compression stroke when the pressure in said combustion chamber is substantially atmospheric, at an engine output shaft angle after that angle and after ignition but before TDC and at crank angles after TDC in order to measure performance characteristics of said engine.

2. An internal combustion engine as defined in claim 1, wherein the engine characteristic measured is IMEP, and IMEP is computed in accordance with the following formula:

$$IMEP = CP0 + C1(P1-P0) + C2(P2-P0) + \ldots CN(PN-P0)$$

wherein P equals pressure measured at the designated point, C-CN are constants.

3. An internal combustion engine as defined in claim 2, wherein the engine comprises a two-cycle crankcase compression engine and the timing at which P0 is taken is no less than about 135° before top dead center.

4. An internal combustion engine as defined in claim 2, wherein the engine is a four-cycle internal combustion engine and the timing of P0 is at approximately bottom dead center.

5. An internal combustion engine as defined in claim 2, wherein the engine ignition timing is controlled in response to the calculated IMEP.

6. An internal combustion engine as defined in claim 5, wherein the engine control is varied in response to changes of IMEP on a cycle-to-cycle basis.

7. An internal combustion engine .as defined in claim 5, wherein ignition is initiated by the firing of a spark plug.

8. An internal combustion engine as defined in claim 7, wherein the engine is provided with a fuel injector, and the timing of beginning and ending of fuel injection is controlled by the measured IMEP.

9. An internal combustion engine as defined in claim 5, wherein the engine operates on a diesel cycle, and the ignition timing is controlled by controlling the timing of direct fuel injection into the combustion chamber.

10. An internal combustion engine as defined in claim 9, wherein the duration of fuel injection is also controlled in response to the calculated IMEP.

11. An internal combustion engine as defined in claim 1, wherein the combustion rate at or near top dead center is calculated based upon using the combustion chamber pressure.

12. An internal combustion engine as defined in claim 11, wherein the engine characteristic measured is IMEP, and IMEP is computed in accordance with the following formula:

$$IMEP = CP0 + C1(P1-P0) + C2(P2-P_o) + \ldots CN(PN-P0)$$

wherein P equals pressure measured at the designated point, C-CN are constants.

13. An internal combustion engine as defined in claim 12, wherein the engine comprises a two-cycle crankcase compression engine and the timing at which $P_0$ is taken is no less than about 135° before top dead center.

14. An internal combustion engine as defined in claim 12, wherein the engine is a four-cycle internal combustion engine and the timing of $P_0$ is at approximately bottom dead center.

15. An internal combustion engine as defined in claim 12, wherein the engine ignition timing is controlled in response to the calculated IMEP.

16. An internal combustion engine as defined in claim 15, wherein the engine control is varied in response to changes of IMEP on a cycle-to-cycle basis.

17. An internal combustion engine as defined in claim 15, wherein ignition is initiated by the firing of a spark plug.

18. An internal combustion engine as defined in claim 17, wherein the engine is provided with a fuel injector, and the timing of beginning and ending of fuel injection is controlled by the measured IMEP.

19. An internal combustion engine as defined in claim 15, wherein the engine operates on a diesel cycle, and the ignition timing is controlled by controlling the timing of direct fuel injection into the combustion chamber.

20. An internal combustion engine as defined in claim 19, wherein the duration of fuel injection is also controlled in response to the calculated IMEP.

21. A control method for an internal combustion engine having a combustion chamber which varies cyclically in volume during engine operation from a maximum, volume BDC condition and a minimum volume TDC condition, an induction system for delivering an intake charge to said combustion chamber, means for initiating combustion in said combustion chamber, and an exhaust system for discharging exhaust gases from said combustion chamber, said method comprising the steps of sensing pressure in said combustion chamber at at least certain engine output shaft angles, and taking a pressure reading at a time between the end of the exhaust stroke and the beginning of the compression stroke when the pressure in said combustion chamber is substantially atmospheric, at an engine output shaft angle after that angle and after ignition but before TDC and at crank angles after TDC in order to measure performance characteristics of said engine.

22. A control method for an internal combustion engine as defined in claim 21, wherein the engine characteristic measured is IMEP, and IMEP is computed in accordance with the following formula:

$$IMEP = CP0 + C1(P1-P0) + C2(P2-P_o) + \ldots CN(PN-P0)$$

wherein P equals pressure measured at the designated point, C-CN are constants.

23. A control method for an internal combustion engine as defined in claim 22, wherein the engine comprises a two-cycle crankcase compression engine and the timing at which P0 is taken is no less than about 135° before top dead center.

24. A control method for an internal combustion engine as defined in claim 22, wherein the engine is a four-cycle internal combustion engine and the timing of P0 is at approximately bottom dead center.

25. A control method for an internal combustion engine as defined in claim 22, wherein the engine ignition timing is controlled in response to the calculated IMEP.

26. A control method for an internal combustion engine as defined in claim 25, wherein the engine control is varied in response to changes of IMEP on a cycle-to-cycle basis.

27. A control method for an internal combustion engine as defined in claim 25, wherein ignition is initiated by the firing of a spark plug.

28. A control method for an internal combustion engine as defined in claim 27, wherein the engine is provided with a fuel injector, and the timing of beginning and ending of fuel injection is controlled by the measured IMEP.

29. A control method for an internal combustion engine as defined in claim 25, wherein the engine operates on a diesel cycle, and the ignition timing is controlled by controlling the timing of direct fuel injection into the combustion chamber.

30. A control method for an internal combustion engine as defined in claim 29, wherein the duration of fuel injection is also controlled in response to the calculated IMEP.

31. A control method for an internal combustion engine as defined in claim 21, wherein the combustion rate at or near top dead center is calculated based upon using the combustion chamber pressure.

32. A control method for an internal combustion engine as defined in claim 31, wherein the engine characteristic measured is IMEP, and IMEP is computed in accordance with the following formula:

$$IMEP=CP0+C1(P1-P0)+C2(P2-P0)+ \ldots CN(PN-P0)$$

wherein P equals pressure measured at the designated point, C-CN are constants.

33. A control method for an internal combustion engine as defined in claim 32, wherein the engine comprises a two-cycle crankcase compression engine and the timing at which $P_0$ is taken is no less than about 135° before top dead center.

34. A control method for an internal combustion engine as defined in claim 32, wherein the engine is a four-cycle internal combustion engine and the timing of $P_0$ is at approximately bottom dead center.

35. A control method for an internal combustion engine as defined in claim 32, wherein the engine ignition timing is controlled in response to the calculated IMEP.

36. A control method for an internal combustion engine as defined in claim 35, wherein the engine control is varied in response to changes of IMEP on a cycle-to-cycle basis.

37. A control method for an internal combustion engine as defined in claim 35, wherein ignition is initiated by the firing of a spark plug.

38. A control method for an internal combustion engine as defined in claim 37, wherein the engine is provided with a fuel injector, and the timing of beginning and ending of fuel injection is controlled by the measured IMEP.

39. A control method for an internal combustion engine as defined in claim 35, wherein the engine operates on a diesel cycle, and the ignition timing is controlled by controlling the timing of direct fuel injection into the combustion chamber.

40. A control method for an internal combustion engine as defined in claim 39, wherein the duration of fuel injection is also controlled in response to the calculated IMEP.

* * * * *